US009344379B2

(12) United States Patent
Young et al.

(10) Patent No.: US 9,344,379 B2
(45) Date of Patent: *May 17, 2016

(54) SYSTEM AND METHOD FOR FACILITATING DISTRIBUTION OF LIMITED RESOURCES

(71) Applicant: Afilias Limited, Dublin (IE)

(72) Inventors: Michael Young, Toronto (CA); Frank Thompson, Toronto (CA); Cedarampattu Mohan, Yardley, PA (US)

(73) Assignee: Afilias Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,418

(22) Filed: Apr. 29, 2014

(65) Prior Publication Data

US 2014/0258542 A1   Sep. 11, 2014

Related U.S. Application Data

(63) Continuation of application No. 13/541,993, filed on Jul. 5, 2012, now Pat. No. 8,738,776, which is a continuation of application No. 11/532,061, filed on Sep. 14, 2006, now Pat. No. 8,234,379.

(51) Int. Cl.
*H04L 29/12* (2006.01)
*H04L 12/911* (2013.01)
(Continued)

(52) U.S. Cl.
CPC ............. *H04L 47/70* (2013.01); *G06Q 30/08* (2013.01); *H04L 29/08144* (2013.01); *H04L 29/12594* (2013.01); *H04L 61/3015* (2013.01); *H04L 67/10* (2013.01)

(58) Field of Classification Search
CPC ............. H04L 47/70; H04L 29/08144; H04L 29/12594; H04L 61/3015; H04L 67/10; G06Q 30/08

USPC .......................................... 709/223–226, 230
See application file for complete search history.

(56) References Cited

U.S. PATENT DOCUMENTS 5,333,317 A    7/1994  Dann
5,682,158 A   10/1997  Edberg et al.
(Continued)

FOREIGN PATENT DOCUMENTS

CA    2394483 A1    6/2001
CA    2423969 A1    4/2002
(Continued)

OTHER PUBLICATIONS

J-C. Bolot, et al., "Evaluating Caching Schemes for the X.500 Directory System", Proceedings of the 13th International Conference on Distributed Computing Systems, Pittsburgh, PA. XP-000399379. May 25-28, 1993, pp. 112-119.
(Continued)

*Primary Examiner* — Catherine Thiaw
(74) *Attorney, Agent, or Firm* — Grant Tisdall; Gowling WLG (Canada) LLP

(57) ABSTRACT

A method is provided for distributing limited resources. The method comprising the following steps. A plurality of limited resources about to expire on a given day is determined. The plurality of limited resources is made available simultaneously. Resource requests from a plurality of clients for a registration period are allowed starting at a predetermined time. The resource requests are processed after the registration period by correlating the limited resources with the received resource requests.

20 Claims, 3 Drawing Sheets

(51) Int. Cl.
*G06Q 30/08* (2012.01)
*H04L 29/08* (2006.01)

(56) References Cited

U.S. PATENT DOCUMENTS

| | | |
|---|---|---|
| 5,781,901 A | 7/1998 | Kuzma |
| 5,835,912 A | 11/1998 | Pet |
| 5,864,854 A | 1/1999 | Boyle |
| 5,929,792 A | 7/1999 | Herriot |
| 6,016,512 A | 1/2000 | Huitema |
| 6,038,599 A | 3/2000 | Black et al. |
| 6,092,178 A | 7/2000 | Jindal et al. |
| 6,182,148 B1 | 1/2001 | Tout |
| 6,230,156 B1 | 5/2001 | Hussey |
| 6,292,770 B1 | 9/2001 | Zeber |
| 6,314,469 B1 | 11/2001 | Tan et al. |
| 6,334,140 B1 | 12/2001 | Kawamata |
| 6,446,133 B1 | 9/2002 | Tan et al. |
| 6,449,657 B2 | 9/2002 | Stanbach et al. |
| 6,539,118 B1 | 3/2003 | Murray et al. |
| 6,560,596 B1 | 5/2003 | Marguilies et al. |
| 6,668,253 B1 | 12/2003 | Thompson et al. |
| 6,754,694 B1 | 6/2004 | Hiura et al. |
| 6,807,254 B1 | 10/2004 | Guedalia et al. |
| 6,880,007 B1 | 4/2005 | Gardos et al. |
| 7,039,697 B2 | 5/2006 | Bayles |
| 7,058,417 B2 | 6/2006 | Jeong |
| 7,085,740 B1 | 8/2006 | Meyers |
| 7,130,878 B2 | 10/2006 | Parsons et al. |
| 7,136,901 B2 | 11/2006 | Chung et al. |
| 7,251,630 B1 | 7/2007 | Gupta et al. |
| 7,264,152 B2 | 9/2007 | Tsuei et al. |
| 7,454,497 B1 | 11/2008 | Estabrooks |
| 7,460,556 B2 | 12/2008 | Duggirala et al. |
| 7,461,022 B1 | 12/2008 | Churchill et al. |
| 7,657,777 B2 | 2/2010 | Wong et al. |
| 8,078,483 B1 * | 12/2011 | Hirose et al. ............ 705/5 |
| 2001/0025320 A1 | 9/2001 | Seng et al. |
| 2001/0043594 A1 | 11/2001 | Ogawa et al. |
| 2002/0026321 A1 | 2/2002 | Faris et al. |
| 2002/0032740 A1 | 3/2002 | Stern et al. |
| 2002/0087714 A1 | 7/2002 | Connor |
| 2002/0091827 A1 | 7/2002 | King et al. |
| 2002/0120689 A1 | 8/2002 | Kang et al. |
| 2002/0188545 A1 | 12/2002 | Wiesehuegel et al. |
| 2003/0005157 A1 | 1/2003 | Chung et al. |
| 2003/0028647 A1 | 2/2003 | Grosu |
| 2003/0046353 A1 | 3/2003 | Chung et al. |
| 2003/0088433 A1 | 5/2003 | Young et al. |
| 2003/0088704 A1 | 5/2003 | Mertama et al. |
| 2003/0163691 A1 | 8/2003 | Johnson |
| 2003/0208547 A1 | 11/2003 | Branimir |
| 2003/0210429 A1 | 11/2003 | Yamashita |
| 2003/0225670 A1 | 12/2003 | DeCarlo, III |
| 2003/0227392 A1 | 12/2003 | Ebert et al. |
| 2004/0006497 A1 | 1/2004 | Nestor et al. |
| 2004/0083287 A1 * | 4/2004 | Gao et al. ............ 709/226 |
| 2004/0122904 A1 | 6/2004 | Kim |
| 2004/0167982 A1 | 8/2004 | Cohen et al. |
| 2004/0172463 A1 | 9/2004 | King et al. |
| 2004/0177144 A1 | 9/2004 | Yip |
| 2004/0206824 A1 | 10/2004 | Lapstun et al. |
| 2004/0225637 A1 | 11/2004 | Heinzel et al. |
| 2005/0071421 A1 | 3/2005 | Calo et al. |
| 2005/0102354 A1 | 5/2005 | Hollenbeck et al. |
| 2005/0125451 A1 | 6/2005 | Mooney |
| 2005/0147069 A1 | 7/2005 | Rink et al. |
| 2005/0172031 A1 | 8/2005 | Adelman |
| 2005/0251500 A1 | 11/2005 | Vahalia et al. |
| 2005/0273344 A1 | 12/2005 | Lee et al. |
| 2006/0111960 A1 | 5/2006 | Chess et al. |
| 2006/0161682 A1 | 7/2006 | King et al. |
| 2006/0242301 A1 | 10/2006 | Horton et al. |
| 2007/0083656 A1 | 4/2007 | Bobo |
| 2007/0100999 A1 | 5/2007 | Haider |
| 2007/0130284 A1 | 6/2007 | Stahura |
| 2007/0174171 A1 | 7/2007 | Sheffield |
| 2008/0005342 A1 | 1/2008 | Schneider |
| 2008/0189192 A1 | 8/2008 | Ronen et al. |
| 2008/0244027 A1 | 10/2008 | Foulger et al. |
| 2009/0271283 A1 | 10/2009 | Fosnacht et al. |

FOREIGN PATENT DOCUMENTS

| | | |
|---|---|---|
| EP | 0565850 A1 | 10/1993 |
| EP | 1566756 A1 | 8/2005 |
| WO | 9919814 | 4/1999 |
| WO | 0013081 | 3/2000 |
| WO | 0050966 | 8/2000 |
| WO | 0139457 A2 | 5/2001 |
| WO | 0159605 A1 | 8/2001 |
| WO | 0247048 A2 | 6/2002 |
| WO | 2005109228 A2 | 11/2005 |
| WO | 2005119542 A1 | 12/2005 |
| WO | 200636898 A2 | 4/2006 |
| WO | 2007139552 A1 | 12/2007 |

OTHER PUBLICATIONS

B. Smetaniuk, "Distributed Operation of the X.500 Directory", Computer Networks and ISDN Systems, vol. 21, No. 1, (XP-000177093), Mar. 1991, pp. 17-40.

Canadian Office Action dated Oct. 16, 2008 issued from the Canadian Intellectual Property Office relating to Canadian Patent Application No. 2,393,619.

English translation of Japanese Office Action dated Nov. 4, 2009 issued from the Japanese Patent Office relating to Japanese Patent Application No. 2001-540973.

Canadian Office Action dated Oct. 29, 2008 issued from the Canadian Intellectual Property Office relating to Canadian Patent Application No. 2,392,624.

English translation of Japanese Office Action dated Oct. 5, 2010 issued from the Japanese Patent Office relating to Japanese Patent Application No. 2001-540486.

International Search Report & Written Opinion dated Jun. 29, 2009 issued from the Canadian Intellectual Property Office relating to PCT International Patent Application No. PCT/CA2009/000287.

Extended European Search Report dated Nov. 3, 2011 issued from the European Patent Office relating to European Patent Application No. 07800616.0.

Australian Examination Report dated Jul. 15, 2010 issued from the Australian Patent Office relating to Australian Patent Application No. 2007295846.

Canadian Office Action dated Jun. 18, 2010 issued from the Canadian Intellectual Property Office relating to Canadian Patent Application No. 2,663,475.

Canadian Office Action dated Dec. 13, 2011 issued from the Canadian Intellectual Property Office relating to Canadian Patent Application No. 2,663,475.

English Translation of Chinese Office Action dated Sep. 6, 2011 issued from the State Intellectual Property Office relating to Chinese Patent Application No. 200780034304.8.

International Search Report & Written Opinion dated Jun. 30, 2011 issued from the Canadian Intellectual Property Office relating to PCT International Application No. PCT/CA2011/000262.

English Translation of Japanese Office Action dated May 8, 2012 issued from the Japanese Patent Office relating to Japanese Patent Application No. 2009-527661.

English translation of Japanese Decision Rejection dated Feb. 18, 2014 issued from the Japanese Patent Office relating to Japanese Patent Application No. 2010-550,005.

International Preliminary Report on Patentability dated Mar. 26, 2009 issued from the International Bureau of WIPO relating to PCT International Patent Application No. PCT/CA2007/001617.

International Search Report & Written Opinion dated Dec. 27, 2007 issued from the Canadian Intellectual Property Office relating to PCT International Patent Application No. PCT/CA2007/001617.

(56) References Cited

OTHER PUBLICATIONS

Canadian Office Action dated May 13, 2013 issued from the Canadian Intellectual Property Office relating to Canadian Patent Application No. 2,663,475.

English Translation of Chinese Office Action dated Dec. 24, 2012 issued from the State Intellectual Property Office relating to Chinese Patent Application No. 200780034304.8.

English Translation of Chinese Office Action dated Jun. 8, 2012 issued from the State Intellectual Property Office relating to Chinese Patent Application No. 200780034304.8.

Product Lifecycle Management, Accessed Feb. 6, 2011, date unknown, http://en.wikipedia.org/wiki/Product_lifestyle_management.

English translation of Japanese Office action dated Mar. 19, 2013 issued from the Japanese Patent Office relating to Japanese Patent Application No. 2010-550,005.

PCT International Search Report and Written Opinion dated Feb. 12, 2008 issued from the Canadian Intellectual Property Office relating to PCT International Patent Application No. PCT/CA2007/001894.

Verisign EPC Network Services, "EPC Information Service Implementation Guide", version 1.5 , VeriSign, Aug. 2004, http:/www.verisign.com/static/0161142.pdf.

VeriSign, "VeriSign Discovery Services: Discovery Service Implementation Guide", version 1.0, Nov. 2004, http://www.verisgin.com/stellent/groups/public/documents/guides/029243.pdf.

Canadian Office Action dated Jul. 24, 2013 issued from the Canadian Intellectual Property Office relating to Canadian Patent Application No. 2,667,577.

European Examination Report Jul. 24, 2012 issued from the European Patent Office relating to European Patent Application No. 07816044.7.

Chinese Office Action dated Feb. 4, 2013 issued from the State Intellectual Property Office relating to Chinese Patent Application No. 200980108543.2.

European Examination Report dated Jul. 1, 2013 issued from the European Patent Office relating to European Patent Application No. 09719909.5.

English translation of Japanese Office Action dated May 22, 2012 issued from the Japanese Patent Office relating to Japanese Patent Application No. 2009-533621.

* cited by examiner

SYSTEM AND METHOD FOR FACILITATING DISTRIBUTION OF LIMITED RESOURCES

CROSS-REFERENCE TO RELATED APPLICATIONS

This application is a continuation of earlier application Ser. No. 13/541,993 filed Jul. 5, 2012 which is a continuation of earlier application Ser. No. 11/532,061 filed Sep. 14, 2006 now U.S. Pat. No. 8,234,379, granted on Jul. 31, 2012. The disclosure of which is hereby incorporated by reference in it's entirety.

The present invention relates generally to the distribution of limited resources, and specifically to a server and method for facilitating the distribution of such resources.

BACKGROUND

A domain name is a name that can be entered into a computing device in order to access a web-site, for example. The domain name is looked up in a global Domain Name System (DNS) which informs the computing device of the Internet Protocol (IP) address for that domain name. The computing device can then access the web-site by contacting a server at the received IP address.

Although assigned to a "domain holder" or "registrant", domain names are controlled by domain name registries. Typically registration of a domain name is described as follows. Each registry is assigned one or more top-level domains, such as .com, .org, and the like. Most domain registries implement a registry-registrar model for registering the domain names. In this model, the registry only has to manage its relationship with the registrars. In turn, each registrar maintains its relationship with the registrants.

The registrant purchases a domain name from the registrar. The registrar registers the purchase with the registry. The registry updates the DNS to reflect the IP address of the registrant for the purchased domain name. In order to maintain rights to use the domain names, the registrant pays an renewal fee before an annual expiration date.

If the registrant does not renew the domain name by the expiration date, the domain name becomes expired. A grace period is often provided by the registrar before sending a delete request to the registry.

After the grace period, the registrar requests deletion of the domain name from the registry. Upon request of the deletion, the domain name enters a redemption grace period. The redemption grace period, typically 30 days, allows the registrar (and registrant) to restore the domain name from a pending deletion status and further allows them to renew the domain name. However, during this period all Internet services associated the domain name are disabled.

After the redemption grace period, the domain name becomes locked and enters a redemption hold period. The redemption hold period typically lasts for five days. On the last day, the domain name is officially dropped from the registry database and becomes available for registration on a "first-come, first-served" basis.

Due to the proliferation of the Internet, domain names can be extremely valuable marketing tools. Specifically, domain names that are intuitive can be very useful for a person or company wishing to make information available to the general public. This is a concept that is well known in the art and has led to practices such as domain name speculation.

Accordingly, when a previously used, but desirable domain name becomes available, registrants and, more typically, registrars that are involved in domain name speculation have a great incentive to apply a heavy load on the corresponding registry. Specifically, since domain names are awarded on a first-come, first-served basis, a speculator with the fastest access to the registry, or most number of connections that access the registry, stands the best chance of being the first to register a previously used domain name.

It is desirable for registries to provide relatively equivalent or equal access to previously used domain names that does not favour either large or incumbent registrars in the industry. However, using the first-come, first served model described above rewards registrars with the most powerful equipment or the most number of connections into the registry via multiple proxy registrars. Accordingly, this has resulted in an escalating "arms" race, with competing registrars applying constantly increasing loads against the registry, thereby threatening the ongoing performance and stability of the registry.

For example, the load generated on the registry when registrars attempt to acquire a previously used domain name via the current process is many times greater than that generated during regular registry operations. Therefore, the registry has to be maintained to accommodate a peak bandwidth that is significantly greater than it would typically require for normal operation. Continuing to increase resources at the registry to address this small percentage of competing registrars is an inadequate solution as it provides a continuously escalating additional cost to the registry.

Further, the current process limits fair and equivalent access to the list of previously used domain names being deleted by the registry on a daily basis, as smaller registrars are less likely to have the resources to compete with larger registrars.

Accordingly, it is an object of the present invention to provide a mechanism for acquiring previously used domain names that obviates or mitigates at least some of the problems described above.

SUMMARY

In accordance with an aspect of the present invention there is provide a method for distributing limited resources, the method comprising the steps of: determining a plurality of limited resources about to expire on a given day; making the plurality of limited resources available simultaneously; allowing resource requests from a plurality of clients for a registration period starting at a predetermined time; and processing the resource requests after the registration period by correlating the limited resources with the received resource requests.

In accordance with a further aspect of the present invention there is provide a system for distributing limited resources, the system comprising: a main server configured to provide standard application server functionality; a drop zone server configured to receive resource requests for the limited resource; and a drop zone control module configured determine when the limited resource expires from the main server, parse the drop zone server for corresponding resource requests, and distribute the limited resource accordingly.

In accordance with a further aspect of the present invention there is provided a computer readable medium comprising instructions which, when executing by a computer, cause the computer to implement the steps of: determining a plurality of limited resources about to expire on a given day; making the plurality of limited resources available simultaneously; allowing resource requests from a plurality of clients for a registration period starting at a predetermined time; and processing the resource requests after the registration period by correlating the limited resources with the received resource requests.

In the system described above, the drop zone server may further be configured to make a plurality of limited resources available simultaneously.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
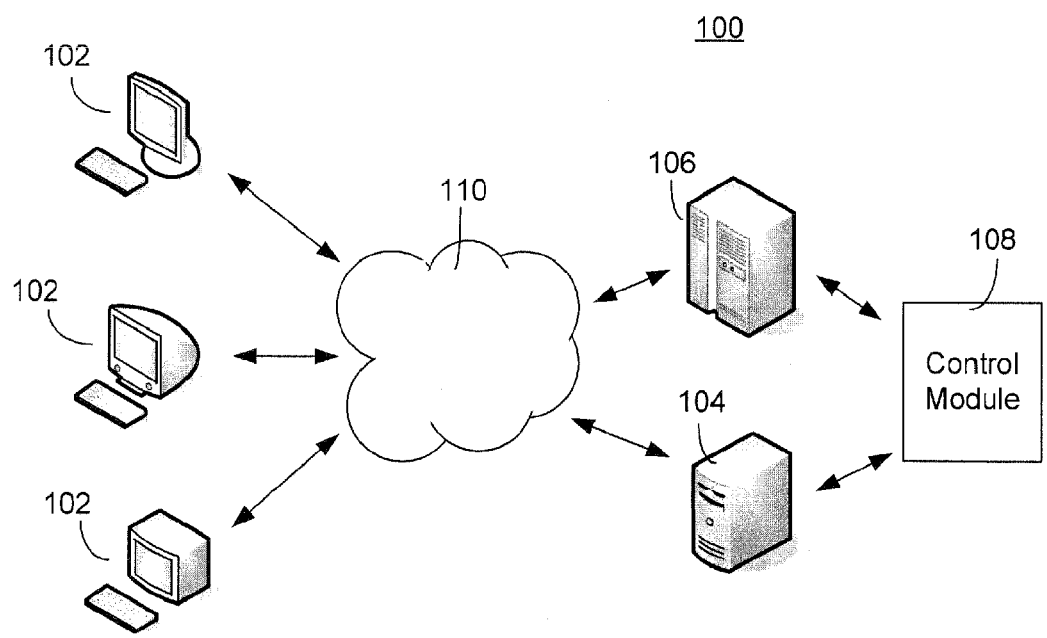
FIG. 1 is block diagram of a drop zone infrastructure.

For convenience, like numerals in the description refer to like structures in the drawings. Referring to FIG. 1, a drop zone infrastructure is illustrated generally by numeral 100. The drop zone infrastructure 100 includes one or more registrars 102, one or more drop zone servers 104, one or more main registry servers 106, and a drop zone control module 108.

The registrars 102 are in communication with both the drop zone server 104 and the main registry server 106 via a communication network 110. As will be appreciated, the communication network 110 may be a wide-area network (WAN), such as the Internet, or a local-area network (LAN).

The drop zone server 104 is in communication with the drop zone control module 108, which is in communication with the main registry servers 106. Although the drop zone control module 108 is illustrated as a separate device, it will be appreciated that it can be incorporated as part of either the drop zone server 104 or the main registry server 106. Further, the registrars 102 have a corresponding account set up with either the drop zone server 104 or main registry server 106, or both, to facilitate payment of services. Different configurations of the drop zone infrastructure 100 will become apparent to a person of ordinary skill in the art.

Effectively, the drop zone server 104 provides a limited registry system. Accordingly, the drop zone server supports a limited number of commands. In the present embodiment, the drop zone server 104 supports three primary commands: Login; Domain Create; and Extensible Provisioning Protocol (EPP) Hello. EPP provides a standard Internet domain name registration protocol for use between the registrars 102 and the main registry server 106. EPP is well known in the art and need not be described in detail. The Login command is used by the registrars 102 to access the drop zone server 104. Domain Create is used to request a domain name. EPP Hello is used to verify connectivity by the registrars 102 to the drop zone servers 104.

The drop zone control module 108 controls the distribution of requested domain names in accordance with available domain names and registration requests submitted to the drop zone servers 104, as will be described. Accordingly, it will be appreciated that the main registry servers 106 can be used primarily for tasks such as maintaining the DNS registry and servicing DNS resolution queries. Connectivity to the drop zone server 104 can be highly limited and equivalent between registrars. For example, each registrar 102 can be limited to three connections to the drop zone server 104. This affords scalability and the ability to maintain separate connectivity policies for the drop zone server 104 and the main registry server 106.

Further, it can be seen that the drop zone server 104 provides a segregated system from the main registry server 106 for managing a synchronized full release of previously used domain names that have reached the end of their redemption hold periods. Registrars 102 will be less likely and will have less incentive to maintain a high number of connections to the main registry server 106 for catching a domain name when previously used domain names are released, or dropped via the drop zone server 104.

Figure 2:
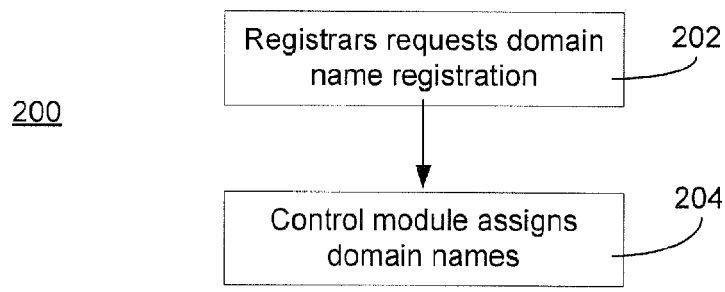
FIG. 2 is a flow chart illustrating a registration process for previous used domain names that become available.

Referring to FIG. 2, a flow diagram illustrating a process for registering a domain name using the drop zone infrastructure 100 is shown generally by numeral 200. In step 202 the registrars submit registration requests to the drop zone server 104 for previously used domain names available for registration. In step 204, the drop zone control module 108 parses the registration requests received by the drop zone server 104 and assigns the previously used domain names accordingly. Both of these steps 202 and 204 are described in greater detail with reference to FIGS. 3 and 4.

Figure 3:
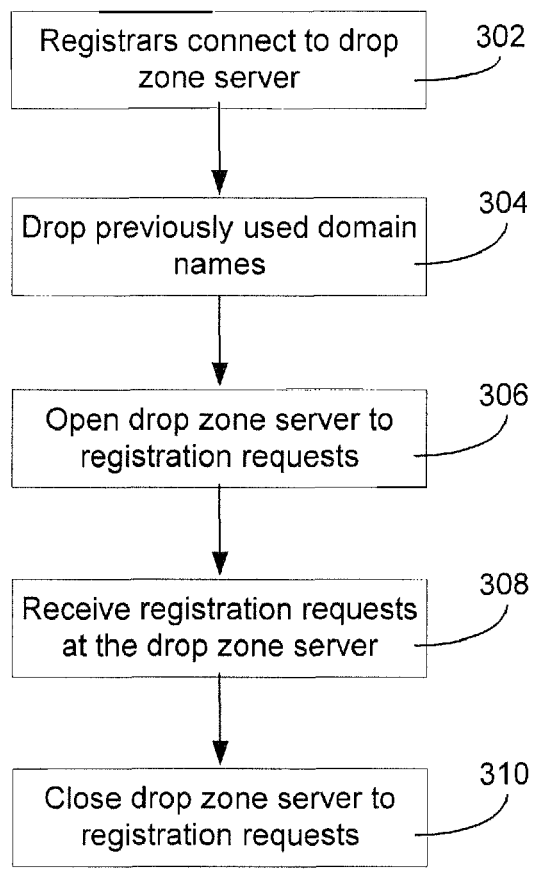
FIG. 3 is a flow chart illustrating the registration request process of FIG. 2 in greater detail.

Referring to FIG. 3, a flow diagram illustrates the step 202 of requesting registration of a previously used domain name in greater detail. In step 302, the registrars 102 connect with the drop zone server 104. The registrars 102 are initially able to test their connectivity to the drop zone server 104 using the EPP Hello command. However, an attempt to register a previously used domain name at this point, using the Domain Create command, would result in an error.

In step 304, a plurality of previously used domain names for which the redemption hold period is expiring that day is made accessible for registration simultaneously to all registrars. In the present embodiment, the term day refers to a calendar day, although it will be appreciated that it can be any predefined time period. Further, in the present embodiment, all previously owned domain names for which the redemption hold period is expiring that day are made accessible.

In step 306, at a predefined time that allows the registrars 102 to have established a connection with the drop zone server 104, a change is made to the status of the drop zone server 104 and it is opened for domain name registrations. Once the drop zone server 104 opens, the registrars 102 can submit registration requests for desired domain names. The registrars 102 may only register for previously used domain names listed for release that day. This information is made available to each of the registrars 102 by a daily published redemption hold period domain reports, provided to all registrars 102.

At step 308, the drop zone server 104 records the received registration requests and maintains them in the order in which they are received. As will be appreciated by a person skilled in the art, this can be achieved in a number of different ways. For example, the registration requests may be maintained in a first-in-first-out (FIFO) queue. Alternatively, the time the registration request is received is stored along with the registration request. In this example, the resolution of the time is sufficient to distinguish between consecutive registration requests. Accordingly, since the order of the registration requests is maintained, the drop zone server 104 accepts duplicate registration requests.

In the present embodiment, it is the responsibility of the registrar 102 to ensure that the registration request is for an available previously used domain name. If the registrar 102 submits an incorrect registration request, for example, for a domain name not in the published report, the request results in an error and is not processed by the drop zone control module 108. Optionally, the registrar is advised of the error via an error message from the drop zone server 104.

In step 310, after a predefined time a change is made to the status of the drop zone server 104 and it is closed to domain name registrations for that day. As an example, the drop zone server 104 remains open for two hours. However, it will be appreciated that since all previously owned domain names available for registration are released simultaneously, they will likely be spoken for within several minutes.

Figure 4:
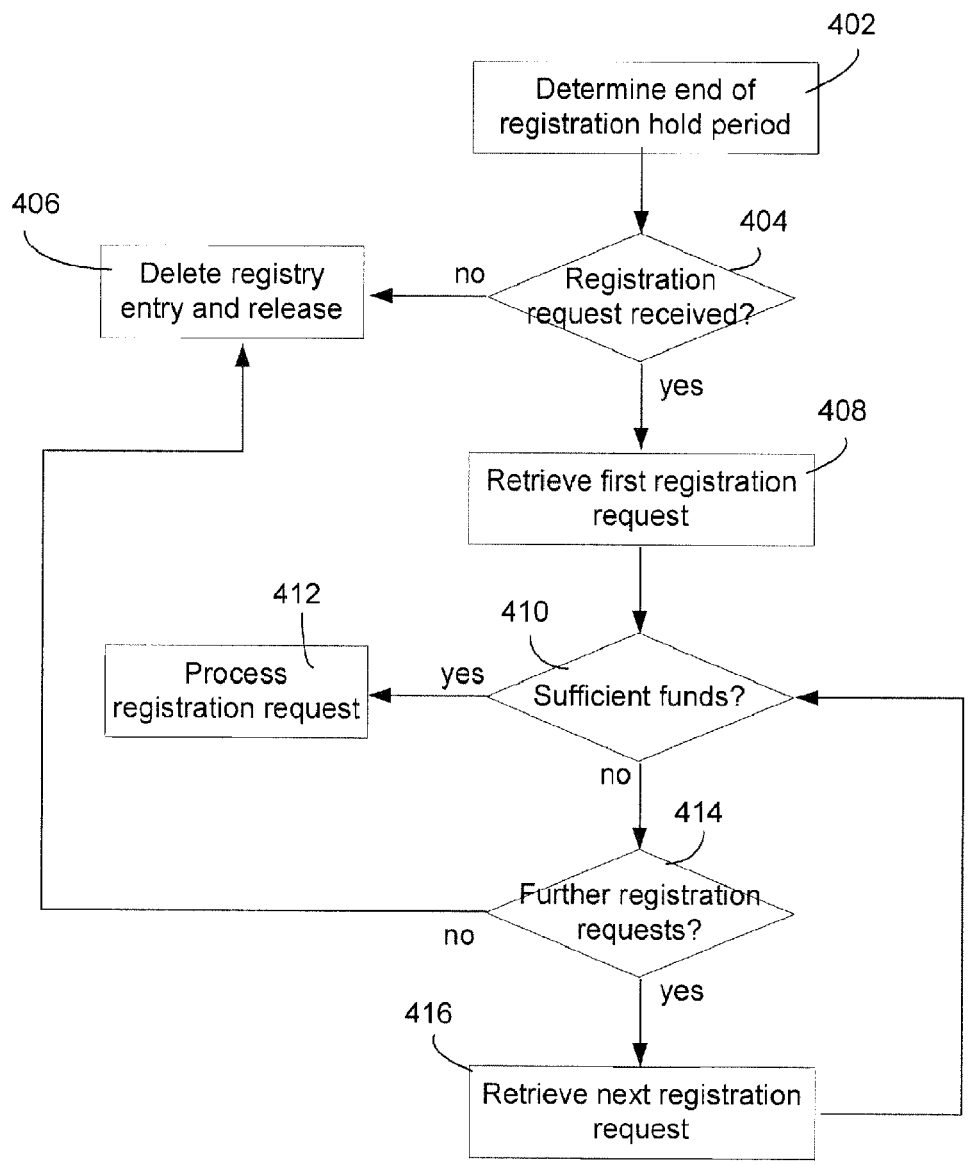
FIG. 4 is a flow chart illustrating the registration fulfillment process of FIG. 2 in greater detail.

Referring to FIG. 4, a flow diagram illustrates the step 204 of assigning a previously owned domain name in greater detail. In step 402, the drop zone control module 108 determines which previously owned domain names maintained by the main registry server 106 are completing their redemption hold period that day.

At step 404, as the redemption hold period expires for each previously used domain name, the drop zone control module 108 determines if a corresponding registration request was submitted to the drop zone server 104. If no corresponding registration request was received for the previously used domain name, the process continues to step 406. In step 406, the previously used domain name is deleted from the main registry server 106 and released in a manner that is standard in the art.

If a corresponding registration request was received for the previously used domain name, the process continues to step 408. In step 408, the drop zone control module 108 retrieves the first received registration request for the previously used domain name. In step 410, the drop zone control module 108 determines whether or not the registrar 102 that submitted the registration request has sufficient funds in its corresponding account to pay for the registration request.

If there are sufficient funds in the account, the drop zone control module 108 continues to step 412. In step 412, the drop zone control module 108 processes the registration request. That is, old registration information for the previously used domain name is deleted and replaced with new registration information provided by the registrar 102. The registrar's corresponding account is charged for the registration.

If, however, there are insufficient funds in the account, the drop zone control module 108 continues to step 414. In step 414, the drop zone control module 108 determines if there are any further registration requests for the previously used domain name.

If there are no further registration requests for the previously used domain name, the drop zone control module 108 continues to step 406 and the previously used domain is released as described above. If, however, there are further registration requests for the previously used domain name, the drop zone control module 108 continues to step 416. In step 416, the drop zone control module 108 retrieves the next sequential registration request from the drop zone server 104.

As previously described, in the present embodiment, the sequence in which the duplicate registration requests are received by the drop zone server 104 is maintained. The drop zone control module 108 returns to step 410 to determine whether or not the registrar 102 that submitted the next sequential registration request has sufficient funds in its corresponding account to pay for the registration request. This process is implemented for the previously used domain names listed in the daily redemption hold period report for that particular day.

The registrar 102 is informed that the registration request was successful via a daily result report. The daily result report lists the results following the completion of the distribution process described above. In the present embodiment, the daily result report is private to each registrar 102. After this point the registrar 102 can confirm the registration of the previously used domain name with the main registry server 106.

Accordingly, it will be appreciated that registration of previously used domain names as described above improves the fairness in which the domain names are distributed. Specifically, since the number of connections per registrar 102 can be significantly limited and a plurality of domain names become available simultaneously, the registrars 102 have to prioritize the previously used domain names for which they will attempt to register. This feature increases the odds that previously used domain names will be distributed more evenly amongst the registrars.

Although the previous embodiment relates specifically to the distribution of previous used domain names, a person skilled in the art will appreciate that the invention need not be so limited. Rather, the same solution may be implemented to solve similar problems. That is, when there are a number of different bidders competing for limited resources the solution described above may be implemented.

For example, consider the case where the limited resources are newly released domain names. This may occur with the release of a new top-level domain or with the release of previously withheld domain names for an existing top-level domain. Such a release would result in a similar problem as the release of previously used domain names. Accordingly, the system and method described above could be implemented to facilitate distribution of these domain names.

As another example, consider the case when the limited resources are auction items rather than previously used domain names. The drop zone server 104 can open to bids on all items for which the auction is expiring during a given time period. Similarly to the embodiment described above, bidders would have to prioritize their bid, rather than being able to focus on each auction item. This, in turn, increases the likelihood that more bidders will be successful in at least one bid.

Although the invention has been described with reference to certain specific embodiments, various modifications thereof will be apparent to those skilled in the art without departing from the scope of the invention as defined by the appended claims.

We claim:

1. A system for distributing a limited resource selected from a plurality of limited resources in response to requests from a plurality of requestors, the system in communication with a main server configured to provide standard application server functionality, including administering the plurality of limited resources, and to implement a first connectivity policy for limiting connectivity thereto, the system comprising:
   a drop zone server configured to:
      implement at least a subset of functionality of the standard application server functionality provided by the main server for administering the plurality of limited resources;
      receive resource requests directly from the plurality of requestors for the selected limited resource on behalf of the main server; and
      implement a second connectivity policy for limiting connectivity thereto, the second connectivity policy allowing a lesser number of connections per requestor than the first connectivity policy; and
   a drop zone control module configured to communicate with both the main server and the drop zone server to determine when the selected limited resource expires from the main server, parse the drop zone server for corresponding resource requests, determine which of the plurality of requestors is to receive the selected limited resource and distribute the selected limited resource accordingly.

2. The system of claim 1, wherein the drop zone server is further configured to make the plurality of limited resources available simultaneously.

3. The system of claim 2, where the plurality of limited resources comprises all limited resources expiring on a given day.

4. The system of claim 2, wherein the selected limited resource is a previously used domain name; the resource request is a registration request; the main server is a main registry server configured to provide domain name system functionality.

5. The system of claim 2, wherein the selected limited resource is a new domain name; the resource request is a registration request; and the main server is a main registry server configured to provide domain name system functionality.

6. The system of claim 2, wherein the selected limited resource is an auction item; the resource request is a bid on the auction item; and the main server is a main auction server configured to provide auction functionality.

7. The system of claim 1, wherein the second connectivity policy limits each client to three connections.

8. The system of claim 1, wherein the drop zone control module is a separate device part of the drop zone server.

9. A method for distributing a limited resource selected from a plurality of limited resources in response to requests from a plurality of requesters in conjunction with a main server configured to provide standard application server functionality, including administering the plurality of limited resources, and to implement a first connectivity policy for limiting connectivity thereto, the method stored as a set of instructions, which, when executed by a computer, cause the computer to implement the steps of:
  implementing at least a subset of functionality of the standard application server functionality provided by the main server for administering the plurality of limited resources;
  receiving resource requests directly from the plurality of requestors for the selected limited resource on behalf of the main server;
  implementing a second connectivity policy, allowing a lesser number of connections per requestor than the first connectivity policy; and
  communicating with the main server to determine when the selected limited resource expires from the main server, parse for corresponding resource requests, determine which of the plurality of requestors is to receive the selected limited resource and distribute the selected limited resource accordingly.

10. The method of claim 9, wherein the plurality of limited resources comprises all limited resources expiring during a given day.

11. The method of claim 9, wherein the plurality of limited resources are processed as they expire.

12. The method of claim 9, wherein duplicate resource requests are maintained and processed in a sequence in which they are received.

13. The method of claim 12, wherein if one of the resource requests fails, a subsequent duplicate resource request is processed.

14. The method of claim 13, wherein the resource request fails due to insufficient funds in an account of a corresponding requesting client.

15. The method of claim 9, further comprising instructions for providing a connection period prior to allowing the resource requests for enabling clients to ensure that they can establish a connection.

16. The method of claim 9, wherein the limited resource is a previously used domain name; the resource request is a registration request; and a client is a registrar.

17. The method of claim 9, wherein the limited resource is a new domain name; the resource request is a registration request; and a client is a registrar.

18. The method of claim 9, wherein the limited resource is an auction item; the resource request is a bid on the limited resource; and a client is a bidder.

19. A system for distributing a domain name in response to requests from a plurality of requestors, the system in communication with a main server configured to provide standard domain name server functionality, including administering the domain name, and to implement a first connectivity policy for limiting connectivity thereto, the system comprising:
  a drop zone server configured to:
    implement at least a subset of functionality the standard domain name server functionality provided by the main server for connecting with the plurality of requestors and receiving registration requests for the domain name;
    receive registration requests directly from the plurality of requestors for the domain name on behalf of the main server; and
    implement a second connectivity policy, for limiting connectivity thereto, the second connectivity policy allowing a lesser number of connections per requestor than the first connectivity policy; and
  a drop zone control module configured to communicate with both the main server and the drop zone server to determine when the domain name expires from the main server, parse the drop zone server for corresponding resource requests, determine which of the plurality of requestors is to receive the domain name, and distribute the domain name accordingly.

20. The system of claim 19, wherein the drop zone control module is a separate device part of the drop zone server.

* * * * *